US008743277B2

(12) United States Patent
Matsuzawa et al.

(10) Patent No.: US 8,743,277 B2
(45) Date of Patent: Jun. 3, 2014

(54) ELECTRONIC APPARATUS

(75) Inventors: Shuichi Matsuzawa, Chofu (JP); Takazumi Seo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/485,669

(22) Filed: May 31, 2012

(65) Prior Publication Data

US 2012/0307138 A1   Dec. 6, 2012

(30) Foreign Application Priority Data

Jun. 3, 2011   (JP) ................................. 2011-125552

(51) Int. Cl.
*H04N 5/225*   (2006.01)
*G03B 13/00*   (2006.01)
*H04N 5/232*   (2006.01)
*G03B 3/00*   (2006.01)
*G03B 3/10*   (2006.01)
*G03B 13/34*   (2006.01)
*G03B 11/04*   (2006.01)

(52) U.S. Cl.
USPC ........... 348/373; 348/345; 348/374; 396/103; 396/131; 396/535

(58) Field of Classification Search
USPC .............. 348/345–357, 373–376; 396/72–88, 396/103, 131, 535–543
See application file for complete search history.

(56) References Cited

U.S. PATENT DOCUMENTS

| 4,038,672 | A | * | 7/1977 | Kondo et al. ................. 396/394 |
| 4,125,850 | A | * | 11/1978 | Fujita et al. .................... 396/302 |
| 4,221,475 | A | * | 9/1980 | Tamura .......................... 396/137 |
| 4,291,348 | A | * | 9/1981 | Pera .............................. 360/96.4 |
| 4,400,076 | A | * | 8/1983 | Miura et al. .................. 396/299 |
| 4,821,059 | A | * | 4/1989 | Nakanishi et al. ............. 396/75 |
| 5,684,640 | A | * | 11/1997 | Tanaka et al. ................. 359/694 |
| 6,628,901 | B2 | * | 9/2003 | Naka ............................. 396/301 |
| 6,869,233 | B2 | * | 3/2005 | Westerweck et al. ......... 396/460 |
| 7,082,265 | B2 | * | 7/2006 | Nishiwaki ...................... 396/85 |
| 7,970,274 | B2 | * | 6/2011 | Yamada et al. ............... 396/260 |
| 8,131,147 | B2 | * | 3/2012 | Kusatsugu .................... 396/535 |
| 8,417,104 | B2 | * | 4/2013 | Lo .................................. 396/85 |
| 8,422,874 | B2 | * | 4/2013 | Suzuka .......................... 396/55 |
| 8,482,661 | B2 | * | 7/2013 | Misawa ........................ 348/367 |
| 8,508,658 | B2 | * | 8/2013 | Kei ............................... 348/373 |
| 2002/0145670 | A1 | * | 10/2002 | Uwagawa et al. ......... 348/231.7 |
| 2004/0051809 | A1 | * | 3/2004 | Adams et al. ................. 348/375 |

(Continued)

FOREIGN PATENT DOCUMENTS

JP   10-339838 A   12/1998

*Primary Examiner* — Michael Osinski

(74) *Attorney, Agent, or Firm* — Canon USA Inc. IP Division

(57) ABSTRACT

An electronic apparatus includes an operation member movable from an initial position with respect to an apparatus body, a first elastic member configured to be deformed from a first state to a second state when the operation member is moved from the initial position and to restore the operation member to the initial position with a force produced to return from the second state to the first state, a second elastic member configured to be held by the first elastic member when the first elastic member is in the first state, and a contact portion configured not to come into contact with the second elastic member when the operation member is at the initial position and to come into contact with the second elastic member when the operation member is moved from the initial position.

11 Claims, 16 Drawing Sheets

(56) References Cited

U.S. PATENT DOCUMENTS

| | | | |
|---|---|---|---|
| 2004/0183934 A1* | 9/2004 | Tatamiya | 348/333.02 |
| 2005/0276594 A1* | 12/2005 | Hamano | 396/177 |
| 2006/0056058 A1* | 3/2006 | Chong et al. | 359/694 |
| 2006/0115252 A1* | 6/2006 | Nomura | 396/55 |
| 2007/0024989 A1* | 2/2007 | Kageyama | 359/699 |
| 2007/0273786 A1* | 11/2007 | Ahn et al. | 348/373 |
| 2008/0290971 A1* | 11/2008 | Weber et al. | 335/35 |
| 2011/0002686 A1* | 1/2011 | Kusatsugu | 396/535 |
| 2011/0007202 A1* | 1/2011 | Chiang | 348/345 |
| 2011/0176799 A1* | 7/2011 | Shintani | 396/484 |
| 2011/0234891 A1* | 9/2011 | Kei | 348/373 |
| 2012/0027394 A1* | 2/2012 | Mochizuki | 396/133 |
| 2012/0170919 A1* | 7/2012 | Suzuka | 396/55 |
| 2012/0230665 A1* | 9/2012 | Okamoto et al. | 396/133 |
| 2012/0249867 A1* | 10/2012 | Sakoda et al. | 348/374 |

* cited by examiner

ELECTRONIC APPARATUS

BACKGROUND OF THE INVENTION

1. Field of the Invention

The present invention relates to an electronic apparatus having an operation member that can be moved relative to an apparatus body.

2. Description of the Related Art

Conventionally, some imaging apparatuses such as a digital still camera and a video camera are endowed with an optical zoom function by which a part of the lenses of a photographic optical system are moved along the optical axis to effect variation of magnification, or an electronic zoom function by which an image signal from an image sensor is electronically controlled to effect an enlarged display of an image plane. Further, some of such imaging apparatuses allow use of the optical zoom function or the electronic zoom function during the recording of a moving image.

In some of such imaging apparatuses, when using the optical and electronic zoom functions, the optical and electronic zoom operations are performed by rotating a zoom lever that is movable, for example, rotatable, relative to the apparatus body. As compared with the construction in which different buttons are operated respectively when the zoom ratio is changed to the wide-angle side and when it is changed to the telephoto side, the construction in which the zoom operation is conducted by rotating the zoom lever easily allows a zoom operation even while checking the object through an image display unit or the like, so that this construction is widely in use.

In connection with a zoom operation device in which a zoom operation is conducted by rotating such a zoom lever, Japanese Patent Application Laid-Open No. 10-339838, for example, discusses a zoom operation device in which a spring member for restoring the zoom lever to a neutral position within a range allowing a rotational operation and the zoom lever are integrated with each other.

However, in the zoom operation device discussed in Japanese Patent Application Laid-Open No. 10-339838, when the zoom lever is rotated toward the wide-angle side or toward the telephoto side, the side surface of a slit provided in the zoom lever contacts a regulation pin configured to regulate the rotation range of the zoom lever, thereby generating a contact noise. Further, when the operation on the zoom lever is stopped with the zoom lever rotated, a pin for retaining the zoom lever at the neutral position and the spring member collide with each other when restoring the zoom lever to the neutral position, resulting in generation of a collision noise. In this way, in the zoom operation device discussed in Japanese Patent Application Laid-Open No. 10-339838, when the zoom lever is operated, there are generated a plurality of noises due to different reasons through an operation on the zoom lever, so that when the zoom lever is operated during the recording of a moving image, an unintended sound is allowed to be recorded. Such a problem is involved not only in the case of a zoom lever but also in the case, for example, of a slide lever linearly movable from an initial position with respect to the apparatus body.

SUMMARY OF THE INVENTION

According to an aspect of the present invention, an electronic apparatus includes an operation member movable from an initial position with respect to an apparatus body, a first elastic member configured to be deformed from a first state to a second state when the operation member is moved from the initial position and to restore the operation member to the initial position with a force produced to return from the second state to the first state, a second elastic member configured to be held by the first elastic member when the first elastic member is in the first state, and a contact portion configured not to come into contact with the second elastic member when the operation member is at the initial position and to come into contact with the second elastic member when the operation member is moved from the initial position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
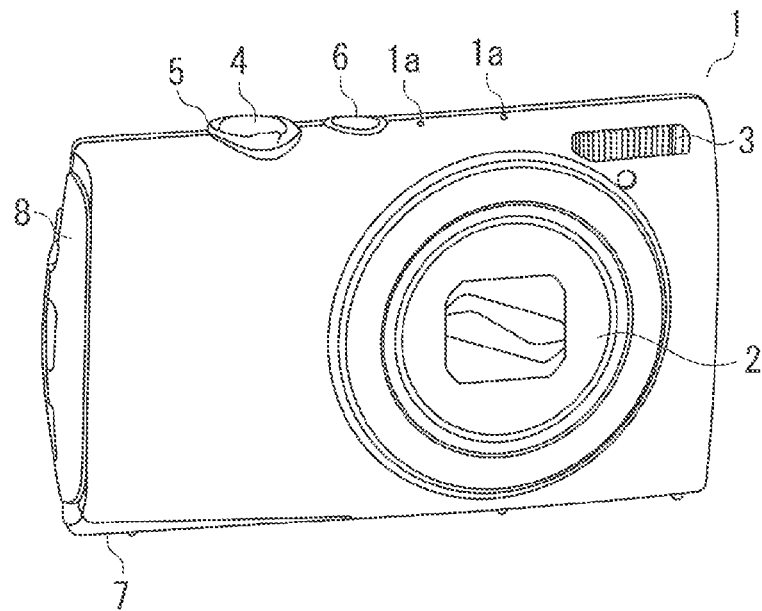
FIGS. 1A and 1B are external views of an imaging apparatus according to a first exemplary embodiment of the present invention.
Figure 1B:
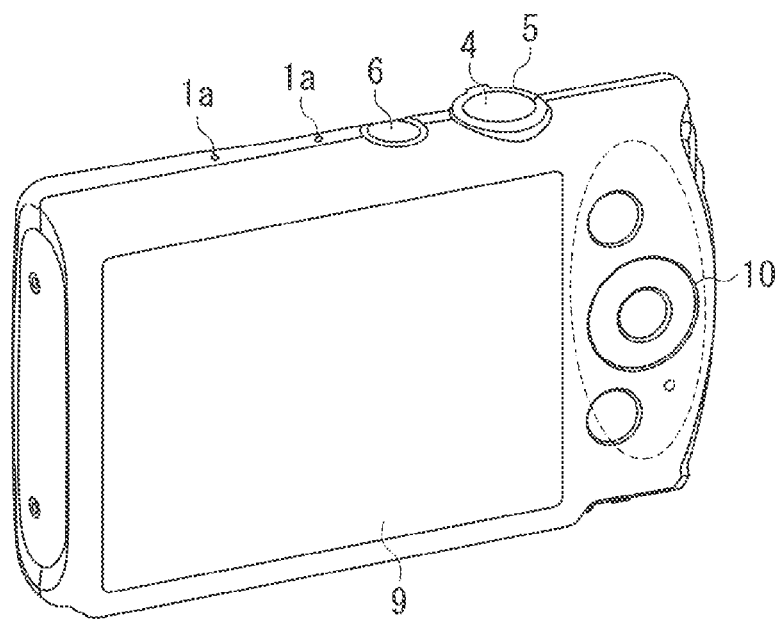

FIGS. 1A and 1B are external views of an imaging apparatus serving as an electronic apparatus according to the first exemplary embodiment of the present invention; FIG. 1A is a perspective view as viewed from the object side (front side), and FIG. 1B is a perspective view as viewed from the operator side (back side).

Provided on the front surface of an image forming apparatus body 1 is a lens barrel 2 configured to form an object image on an image sensor. The lens barrel 2 is a retractable zoom lens, which allows optical zooming and electronic zooming toward the wide-angle side and the telephoto side through the operation of rotating a zoom lever 5 described below.

Inside the imaging apparatus body 1, there is mounted, on the back surface side of the lens barrel 2, an image sensor such as a charge-coupled device (CCD) or a complementary metal oxide semiconductor (CMOS) image sensor (not shown).

Further, inside the imaging apparatus body 1, there are mounted a main board (not illustrated) with a processing circuit for converting image data generated at the image sensor (not illustrated) to digital information, and an auxiliary board (not illustrated).

Mounted on the main board are a recording medium slot including a card interface (I/F) or the like, an imaging unit, an image processing unit, a system control unit, a liquid crystal display (LCD) unit, a serial I/F, a serial connection terminal, etc. Mounted on the auxiliary board are a power supply switching circuit, an AC/DC converter, an operation switch (SW), a video I/F, a video connection terminal, an external power input terminal, etc.

Provided on the upper right-hand side portion of the front surface of the imaging apparatus body 1 is a flash emission window 3, through which light for illuminating the object at the time of shooting is emitted.

A release button 4 is provided on the upper surface of the imaging apparatus body 1. The release button 4 allows a pressing operation in two stages; when a half-press operation, which is the first stage, is performed, shooting preparation operations (light metering operation, focus adjustment operation, etc.) are started. When a full-press operation, which is the second stage, is performed, shooting operations (exposure operation, recording operation, etc.) are started.

A zoom lever 5, which is an operation member rotatable (movable) with respect to the imaging apparatus body 1, is mounted to the outer periphery of the release button 4. When the zoom lever 5 is rotated clockwise as viewed from above the imaging apparatus body 1, the zoom lens performs a zoom operation toward the telephoto side (so as to diminish the angle of view); conversely, when it is rotated counterclockwise, the zoom lens performs a zoom operation toward the wide-angle side (so as to enlarge the angle of view).

A power button 6 is provided by the side of the zoom lever 5. Between the power button 6 and the flash emission window 3, there are provided a pair of microphone holes 1a for allowing a microphone inside the imaging apparatus body 1 to catch sound.

A battery cover 7 is provided on the bottom surface of the imaging apparatus body 1, making it possible to open and close an accommodation chamber accommodating a main battery serving as the power source and an accommodation chamber accommodating a recording medium for recording the object image taken.

Provided on a side surface of the imaging apparatus body 1 is an input/output jack (not illustrated), which is covered with a protective cover member 8. By opening the cover member 8, various cables leading to the input/output jack can be inserted and removed.

Provided on the back surface of the imaging apparatus body 1 is a display unit 9 such as a liquid crystal display unit. The display unit 9 is used to check the object image taken and to reproduce and display the image taken. A plurality of operation buttons 10 are provided by the side of the display unit 9. The plurality of operation buttons 10 are used, for example, when performing various functions such as changing of the shooting condition, changing of the mode of display on the display unit 9, and switching to the reproduction image.

Figure 2A:
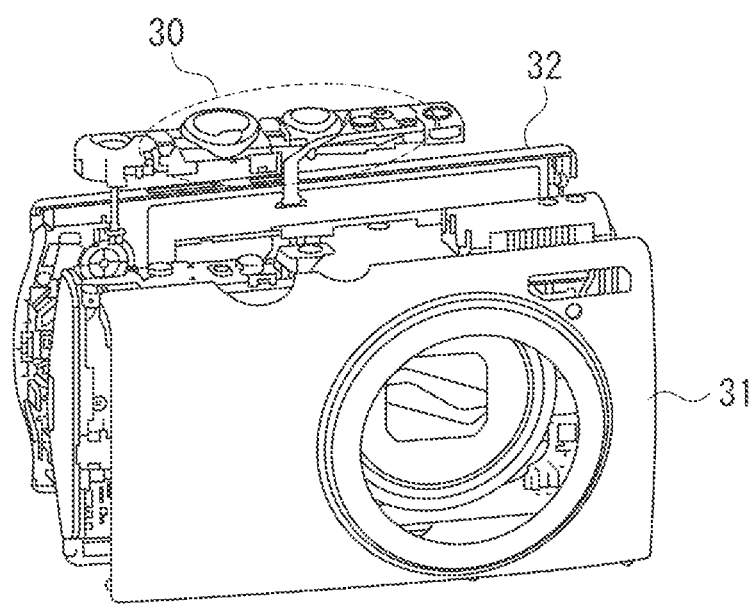
FIGS. 2A, 2B, and 2C are exploded perspective views of the imaging apparatus according to the first exemplary embodiment.
Figure 2B:
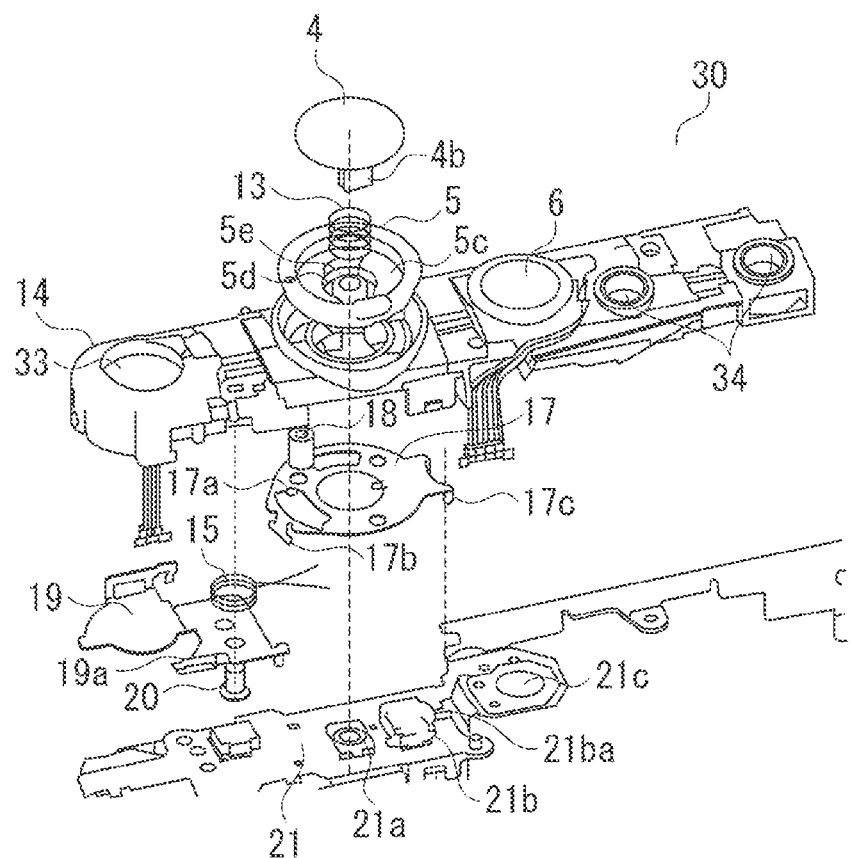
Figure 2C:
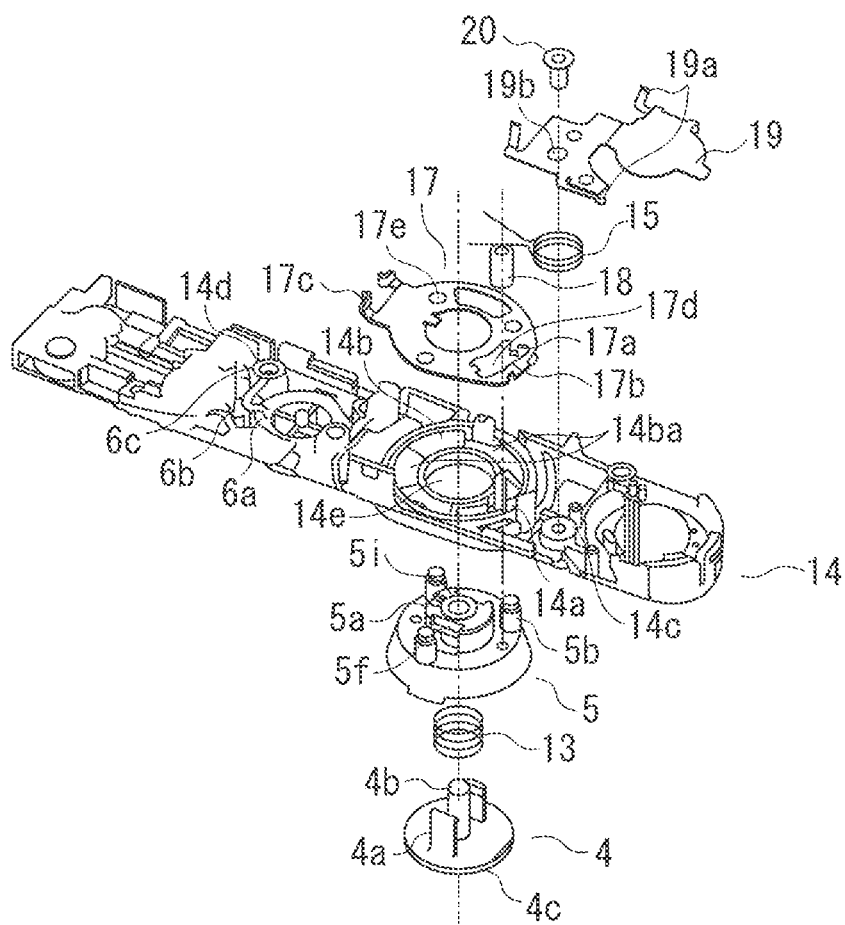

Next, a zoom lever unit 30 including the zoom lever 5 will be described with reference to FIGS. 2A, 2B, and 2C. FIG. 2A is an exploded perspective view of the imaging apparatus body 1 as viewed from the front side, FIG. 2B is an exploded perspective view of the zoom lever unit 30 as viewed from the front side, and FIG. 2C is an exploded perspective view of the zoom lever unit 30 as viewed from below.

The imaging apparatus body 1 is covered with two external covers: a front cover 31 and a back cover 32.

The zoom lever unit 30 is composed of a base member 14, the release button 4, the zoom lever 5, the power button 6, an operation printed circuit board 21, on which various switches are mounted, a speaker 33, a microphone 34, etc.

The release button 4 has a disc-like key top 4c on the upper surface thereof, and a shaft 4b extends downwards from the center of the key top 4c. Further, a pair of hooks 4a extend so as to hold the shaft 4b, and claws extending toward the shaft 4b are provided at the distal ends of the hooks 4a.

On the upper surface of the zoom lever 5, there exist hollow portions in two stages; an upper and larger hollow portion 5c serves as a space which the key top 4c of the release button 4 enters. A lower and smaller hollow portion 5d serves as a space for accommodating a compression spring 13. Further, at the center of the zoom lever 5, there is provided a hole 5e, through which the shaft 4b of the release button 4 is passed.

Provided on the lower surface of the zoom lever 5 is a rotation shaft 5a larger than the hollow portion 5d. There are provided a pair of D-shaped holes 5f extending through the side surface of the rotation shaft 5a.

The hooks 4a of the release button 4 are inserted into the holes 5f; the claws of the hooks 4a are engaged with the lower ends of the holes 5f, whereby the release button 4 is fixed to the zoom lever 5.

In this way, the release button 4 receives from the compression spring 13 a force for urging the release button 4 upwards, and is prevented from detaching from the zoom lever 5 with the claws of the hooks 4a. Thus, the release button 4 is rotatable integrally with the zoom lever 5, and is vertically movable in the direction of the rotation axis of the zoom lever 5 with respect to the zoom lever 5. When, after being pressed, the release button 4 is released from the pressed state, the release button 4 is urged by the compression spring 13 to be restored to the initial position.

On the outer side of the rotation shaft 5a, there are provided shafts 5b at substantially equal intervals so as to surround the rotation shaft 5a; at the distal end of each shaft 5b, there is provided a swaging conical portion 5i to be crushed through heat swaging after being fit-engaged with a hole 17e of a zoom lever fixation plate 17.

The base member 14 is provided with a through-hole 14e, into which the rotation shaft 5a extending downwards from the zoom lever 5 can be inserted. The through-hole 14e is a rotation center hole of the zoom lever 5, and is rotatably and slidably fit-engaged with the rotation shaft 5a. Further, the base member 14 is provided with a plurality of sector-shaped hole portions 14b, into which the shafts 5b extending downward from the zoom lever 5 can be inserted. The rotation of the zoom lever 5 is regulated by the sector-shaped hole portions 14b and the shafts 5b, restricting the rotation range.

Further, on the lower side of the base member 14, there are provided an elastic member mounting shaft 14a, a spring mounting shaft 14c for mounting a coil spring 15, and a shaft 14d to be inserted into a fixation bonding portion 6c at the distal end of a spring portion 6b extending from a key top 6a of the power button 6.

The coil spring 15 is a spring configured to urge the zoom lever 5 to a neutral position, which is the initial position; it is formed of a wire material such as a piano wire or stainless steel. This coil spring 15 is provided with a coil spring seat winding portion 15a, into which the spring mounting shaft 14c of the base member 14 is to be inserted, and a pair of coil spring arm portions 15b to be engaged with a protrusion 17b provided on the zoom lever fixation plate 17 for mounting. At the center of the spring mounting shaft 14c for mounting the coil spring 15, there is provided a screw hole into which a self-tapping screw is to be inserted.

Further, between the coil spring arm portions 15b, there is situated the elastic member mounting shaft 14a of the base member 14, and at least one of the coil spring arm portions 15b and an elastic member 18 is constantly kept in contact with each other.

The zoom lever fixation plate 17 is provided with the holes 17e, into which the conical portions 5i of the shafts 5b of the zoom lever 5 are inserted, and a sector-shaped hole portion 17d, through which the elastic member mounting shaft 14a with the elastic member 18 passed there through extends. The hole portion 17d is provided with raised-and-bent portions 17a at both ends in the rotating direction (moving direction) of the zoom lever 5. The raised-and-bent portions 17a are bent upward (in a direction substantially perpendicular to the rotating direction of the zoom lever 5), and extend upward from the ends of the hole portion 17d. As the zoom lever 5 is rotated, the raised-and-bent portions 17a and the elastic member 18 are brought into contact with each other before the shafts 5b of the zoom lever and a regulating portion 14ba constituting an end of the hole portion 14b of the base member 14 are brought into contact with each other. More specifically, the raised-and-bent portions 17a constitute contact portions that come into contact with the elastic member 18 before the rotation of the zoom lever 5 is regulated by the regulating portion 14ba when the zoom lever 5 is rotated. Thus, when the zoom lever 5 is situated at the initial position, the raised-and-bent portions 17a do not come into contact with the elastic member; when the zoom lever 5 is rotated from the initial position, they come into contact with the elastic member 18.

A protrusion 17b is provided in the line connecting the center of the hole portion 17d and the rotation center of the zoom lever fixation plate 17 and at a position on the outer peripheral side of the zoom lever fixation plate 17 with respect to the hole portion 17d. The protrusion 17b is to be engaged with the coil spring arm portion 15b and protrudes downward; since its distal end is open in a T-shape, the coil arm portion 15b once engaged is not easily detached. The protrusion 17b protrudes in a direction opposite the raised-and-bent portions 17a of the hole portion 17d, and is configured to cause the raised-and-bent portions 17a and the coil spring 15 to be brought into contact with the elastic member 18 at different positions. In this way, the positions at which the raised-and-bent portions 17a and the coil spring 15 are brought into contact with the elastic member 18 are deviated in the direction of the rotation shaft of the zoom lever 5, so that the coil spring 15 does not collide with the raised-and-bent portions 17a when the zoom lever 5 is rotated.

Further, the zoom lever fixation plate 17 is provided with a pair of arm portions 17c arranged so as to hold a lever member 21ba of a zoom switch 21b mounted on the operation printed circuit board 21.

The elastic member 18 is of a hollow cylindrical configuration, and is formed of a material such as elastomer (rubber material) configured to be greatly deformed with small force and having a large elastic strain area. The elastic member 18 is inserted into the elastic member mounting shaft 14a of the base member 14, and is fixed by press contact to the elastic member mounting shaft 14a by utilizing the elasticity of the elastic member 18.

A coil spring fixation plate 19 is formed of a highly conductive metal, and is equipped with a screw hole 19b. Further, the coil spring fixation plate 19 is equipped with an electrical contact portion 19a, which comes into elastic contact with the inner walls of front surface cover 31 and a back surface cover 32 formed of conductive metal, thereby securing electrical contact.

Figure 3A:
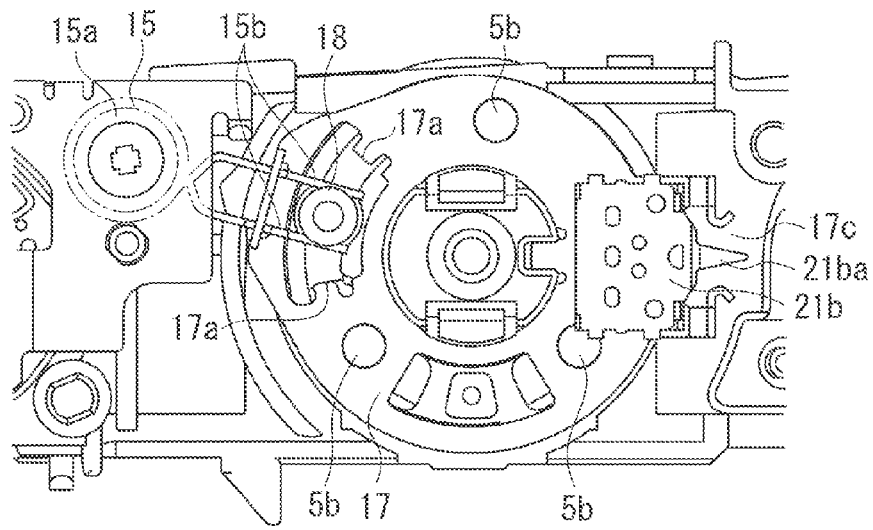
FIGS. 3A and 3B are diagrams illustrating the movement of a zoom lever unit when a zoom lever according to the first exemplary embodiment is rotated.
Figure 3B:
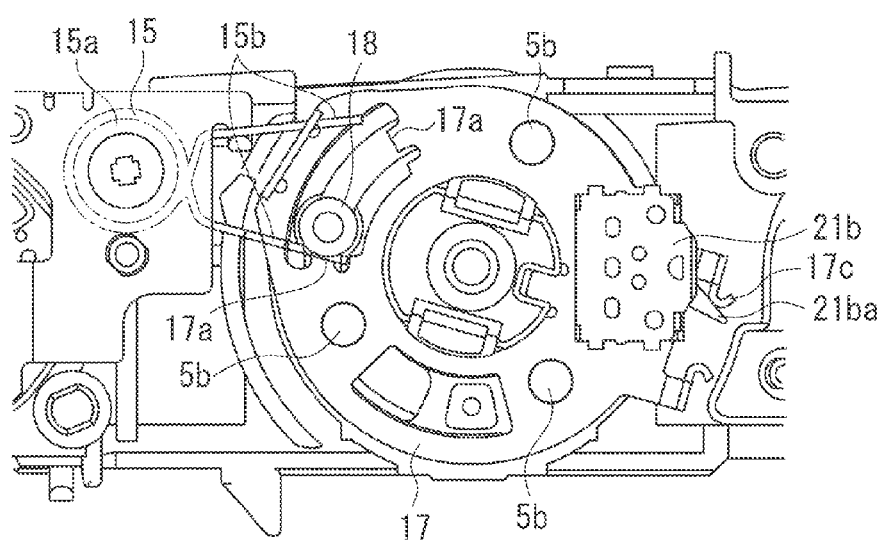

Next, the movement of the zoom lever unit 30 when the zoom lever 5 is rotated will be described with reference to FIGS. 3A and 3B. FIGS. 3A and 3B are diagrams illustrating the zoom lever unit 30 as viewed from below.

As illustrated in FIG. 3A, the elastic member 18 is arranged so as to be in contact with portions in the vicinity of the distal ends of the coil spring arm portion 15b. By keeping the portions in the vicinity of the distal ends of the coil spring arm portions 15b in contact with the elastic member 18 of a still smaller spring constant, it is possible to maintain the zoom lever 5 accurately at the initial position.

In the zoom switch 21b, a lever member 21ba protrudes outwardly from a rectangular base member, and the lever member 21ba is urged toward a neutral position by a coil spring (not illustrated) contained in the base member. When the zoom lever 5 is rotated as illustrated in FIG. 3B (counterclockwise as viewed from above the imaging apparatus), the zoom switch 21b outputs a signal causing the photographing lens to make a zoom movement toward the wide-angle side (so as to enlarge the angle of view). Conversely, when the zoom lever 5 is rotated clockwise, there is output a signal causing the photographing lens to make a zoom movement toward the telephoto side (so as to diminish the angle of view). When its operation on the zoom lever 5 has been completed, the lever member 21ba is restored to the neutral position as illustrated in FIG. 3A.

Figure 4A:
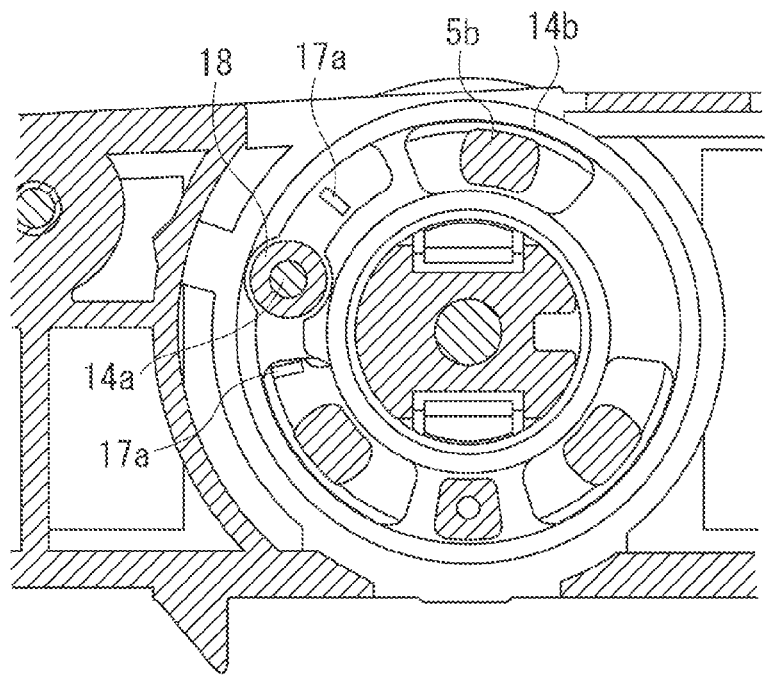
FIGS. 4A, 4B, and 4C are sectional views illustrating the state of an elastic member and of raised-and-bent portions of a zoom lever fixation plate when the zoom lever according to the first exemplary embodiment is rotated.
Figure 4B:
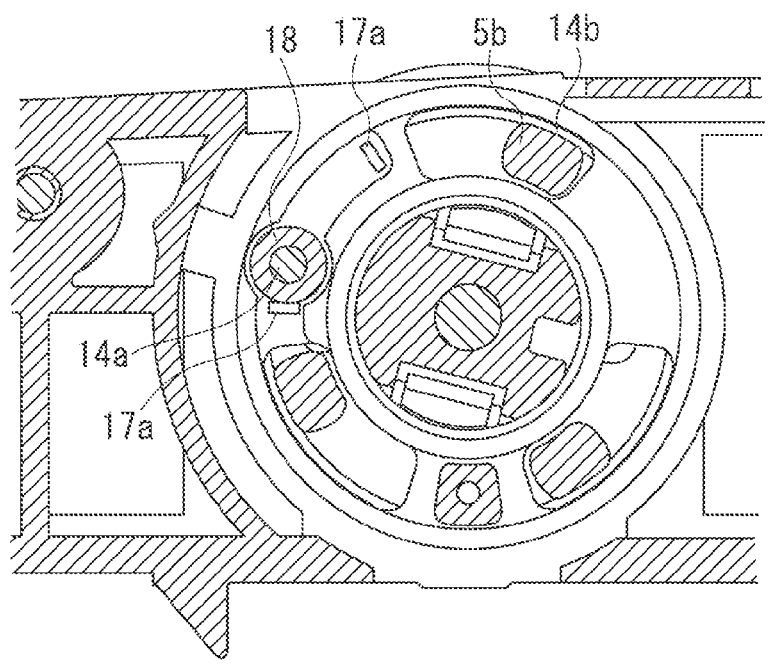
Figure 4C:
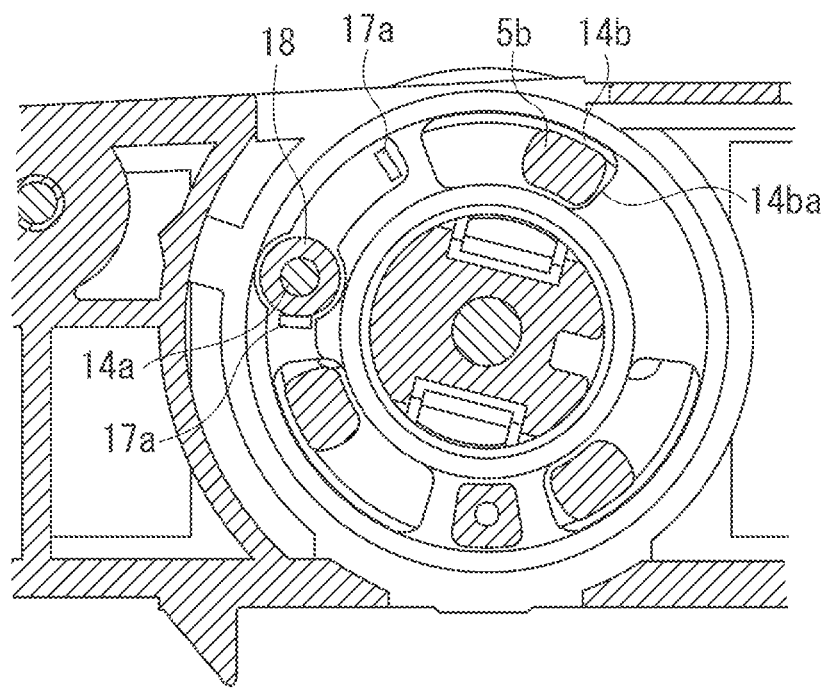

Next, the state of the elastic member 18 and the raised-and-bent portions 17a of the zoom lever fixation plate 17 when the zoom lever 5 is rotated will be described with reference to FIGS. 4A, 4B, and 4C. FIGS. 4A, 4B, and 4C are sectional views facilitating the description of the state of the elastic member 18 and of the raised-and-bent portions 17a of the zoom lever fixation plate 17; they are diagrams illustrating the zoom lever 30 as viewed from below.

FIG. 4A illustrates the zoom lever 5 as situated at the initial position, in which the elastic member 18 mounted to the elastic member mounting shaft 14a is substantially at the center of the hole portion 17d of the zoom lever fixation plate 17. Thus, in the state in which the zoom lever 5 is at the initial position, the elastic member 18 is situated substantially at a central position between the two raised-and-bent portions 17a of the hole portion 17d. The requisite operation amounts (rotation amount) of the zoom lever 5 for causing the elastic member 18 to contact each of the two raised-and-bent portions 17a are substantially equal to each other.

Further, in the state in which the zoom lever 5 is at the initial position, each shaft 5b of the zoom lever 5 is situated substantially at the center of each hole portion 14b of the base member 14.

The sectional view of FIG. 4A illustrates the portion near the proximal end of the elastic member mounting shaft 14a, so that the elastic member undergoes no deformation but exhibits a round section. However, in the portion nearer to the distal end than in the sectional view of FIG. 4A, the elastic member 18 is being pressed by the portions in the vicinity of the distal ends of the coil spring arm portion 15b, so that a part of the elastic member 18 is deformed into an oval shape.

When the zoom lever 5 is rotated, the arm portion 17c of the zoom lever fixation plate 17, which rotates integrally with the zoom lever 5 as stated above, operates the zoom switch 21b, thereby starting the zoom operation.

When the zoom lever 5 is further rotated, one of the raised-and-bent portions 17a of the hole portion 17d and the elastic member 18 are brought into contact with each other as illustrated in FIG. 4B. At this time, each shaft 5b of the zoom lever 5 is not in contact with a regulating portion 14ba at an end of each hole portion 14b of the base member 14.

In this way, before the shafts 5b of the zoom lever 5 are brought into contact with the regulating portions 14ba, one of the raised-and-bent portions 17a of the zoom lever fixation plate 17 and the elastic member 18 are brought into contact with each other, whereby it is possible to reduce the shock when the shafts 5b contact the regulating portions 14ba. Thus, it is possible to reduce the contact noise when the shafts 5b contact the regulating portions 14ba. Further, it is also possible to reduce the shock transmitted to the finger of the operator when the zoom lever 5 is rotated to the rotation limit.

When the zoom lever 5 is further rotated, the elastic member 18 is pressed by the raised-and-bent portion 17a to undergo elastic deformation as illustrated in FIG. 4C, and the shafts 5b and the regulating portions 14ba are brought into contact with each other. The shafts 5b and the regulating portions 14ba do not undergo any deformation, so that it is impossible to further rotate the zoom lever 5 from the state in which the shafts 5b and the regulating portions 14ba are in contact with each other, which means the rotation limit has been attained.

Thus, when an excessive force is applied to the zoom lever 5, the force is received not only by the elastic member mounting shaft 14a of the base member 14 inserted into the elastic member 18 but also by the regulating portions 14ba, so that it is possible to prevent fracture of the elastic member mounting shaft 14a.

Figure 5A:
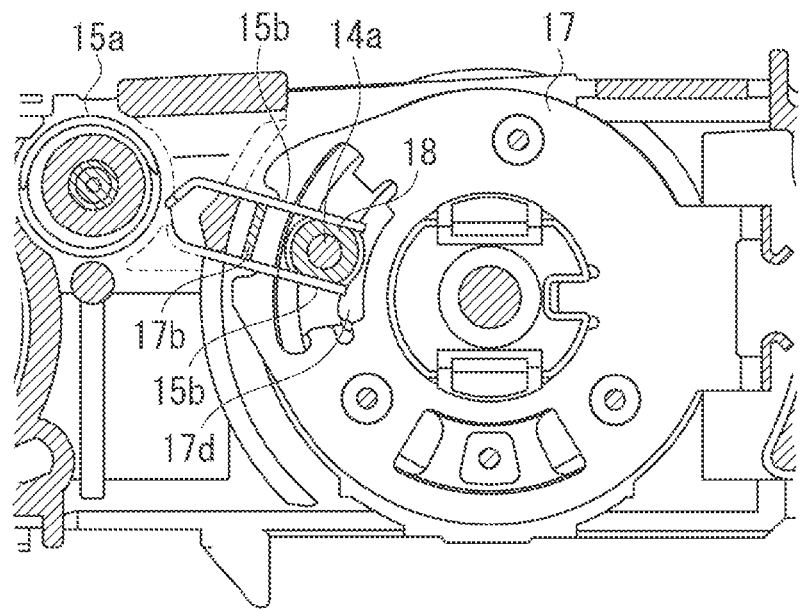
FIGS. 5A and 5B are sectional views illustrating the condition of the elastic member and of a coil spring when the zoom lever according to the first exemplary embodiment is rotated.
Figure 5B:
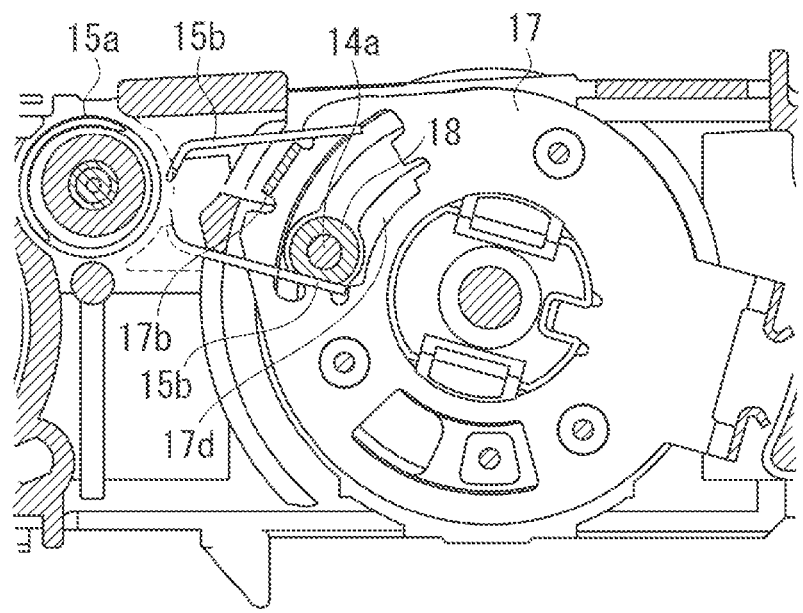

Next, the state of the elastic member 18 and the coil spring 15 when the zoom lever 5 is rotated will be described with reference to FIGS. 5A and 5B. FIGS. 5A and 5B are sectional views facilitating the description of the state of the elastic member 18 and of the coil spring 15; they are diagrams illustrating the zoom lever unit 30 as viewed from below.

As illustrated in FIG. 5A, in the state in which the zoom lever 5 is at the initial state, apart (sectional portion) of the elastic member 18 is held between the portions in the vicinity of the distal ends of both arms of the coil spring arm portion 15b, and is elastically deformed into an oval shape. Further, both arms of the coil spring arm portion 15b are kept in contact with the protrusion 17b of the zoom lever fixation plate 17 so as to hold the proximal end portion of the T-shaped protrusion 17b therebetween.

In this way, in the state in which the zoom lever 5 is at the initial position, both arms of the coil spring arm portion 15b are in contact with both the elastic member 18 and the protrusion 17b. Further, the width in the rotating direction of the elastic member 18 is larger than that of the T-shaped proximal end portion of the protrusion 17b. When the zoom lever 5 is restored to the initial position, it begins to contact both arms of the coil spring arm portion 15b earlier than the protrusion 17b. Thus, in the state in which the zoom lever 5 is at the initial position, the coil spring arm portion 15b and the protrusion 17b are brought into contact with each other, whereby it is possible to reduce the play in the rotating direction of the zoom lever 5 when it is not being rotated. Further, the elastic member 18 absorbs the force produced when the zoom lever 5 is restored to the initial position, whereby it is possible to reduce the shock when the coil spring arm portion 15b and the protrusion 17b collide with each other, thereby reducing the collision noise at the time of collision.

Further, the elastic member 18 is arranged so as to contact the distal end side of the coil spring arm portion 15b earlier than the protrusion 17b. Thus, if the width of the elastic member 18 in the rotating direction of the zoom lever 5 is larger than that of the T-shaped proximal end portion of the protrusion 17b, the distal end portions of the coil spring arm portion 15b bend backward, whereby it is possible to bring both arms of the coil spring arm portion 15b into contact with both the elastic member 18 and the protrusion 17b. In this connection, by taking into account the fact that the distal end portions of the coil spring arm portion 15b bend backward, it is possible to enlarge the width of the elastic member 18, making it possible for the elastic member 18 to absorb the force produced when the zoom lever 5 is restored to the initial position by the elastic member 18.

As illustrated in FIG. 5B, when the zoom lever 5 is rotated, one arm of the coil spring arm portion 15b is brought into contact with the elastic member 18, and the other arm thereof is brought into contact with the protrusion 17b. In this state, the coil spring arm portion 15b is in contact with a corner of the protrusion 17b. This is due to the fact that the spring mounting shaft 14c, to which the coil spring 15 is mounted, differs from the rotation shaft of the zoom lever 5. As the protrusion 17b rotates from the neutral position, the coil spring arm portion 15b comes to be brought into contact with the corner of the protrusion 17b. Further, as the protrusion 17b rotates from the neutral position, the portion held in contact with the protrusion 17b moves to the distal end side of the coil spring arm portion 15b. When the coil spring arm portion 15b comes into contact with the corner of the protrusion 17b, it becomes hard for them to slip with respect to each other, so that when the contact portion moves, stick slip occurs in the coil spring arm portion 15b, and a self-excited oscillation arises.

In the case where the operator is rotating the zoom lever 5 with a finger, this self-excited oscillation is scarcely ever generated since the rotating speed of the zoom lever 5 is low. However, when the zoom lever, which has been rotated, is restored to the initial position by the restoring force of the coil spring 15, the rotating speed of the zoom lever 5 is high, so that self-excited oscillation is likely to be generated.

However, the arm of the coil spring arm portion 15b which is not in contact with the protrusion 17b is in contact with the elastic member 18 while elastically deforming the same, so that the oscillation energy of the above-mentioned self-excited oscillation is absorbed by the elastic member 18. Thus, it is possible to reduce the self-excited oscillation of the coil spring arm portion 15b, making it possible to reduce the noise (oscillation noise) generated through rubbing against the protrusion 17b when the coil spring arm portion 15b oscillates.

Figure 6A:
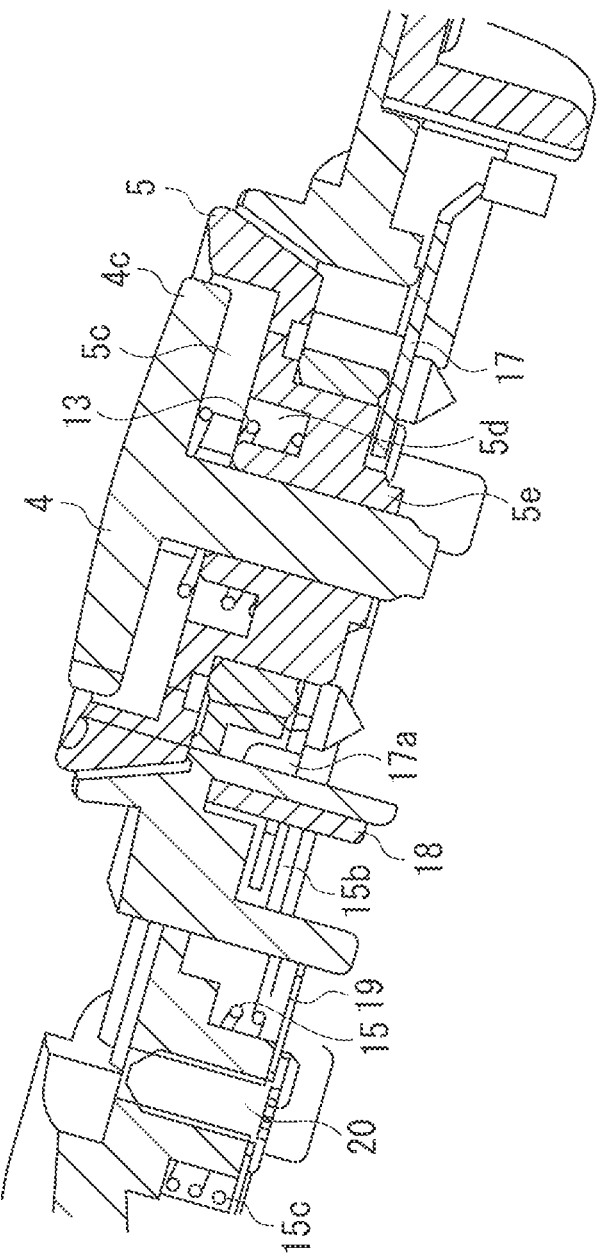
FIGS. 6A and 6B are sectional views taken in the direction of the rotation axis of a zoom lever unit according to the first exemplary embodiment.
Figure 6B:
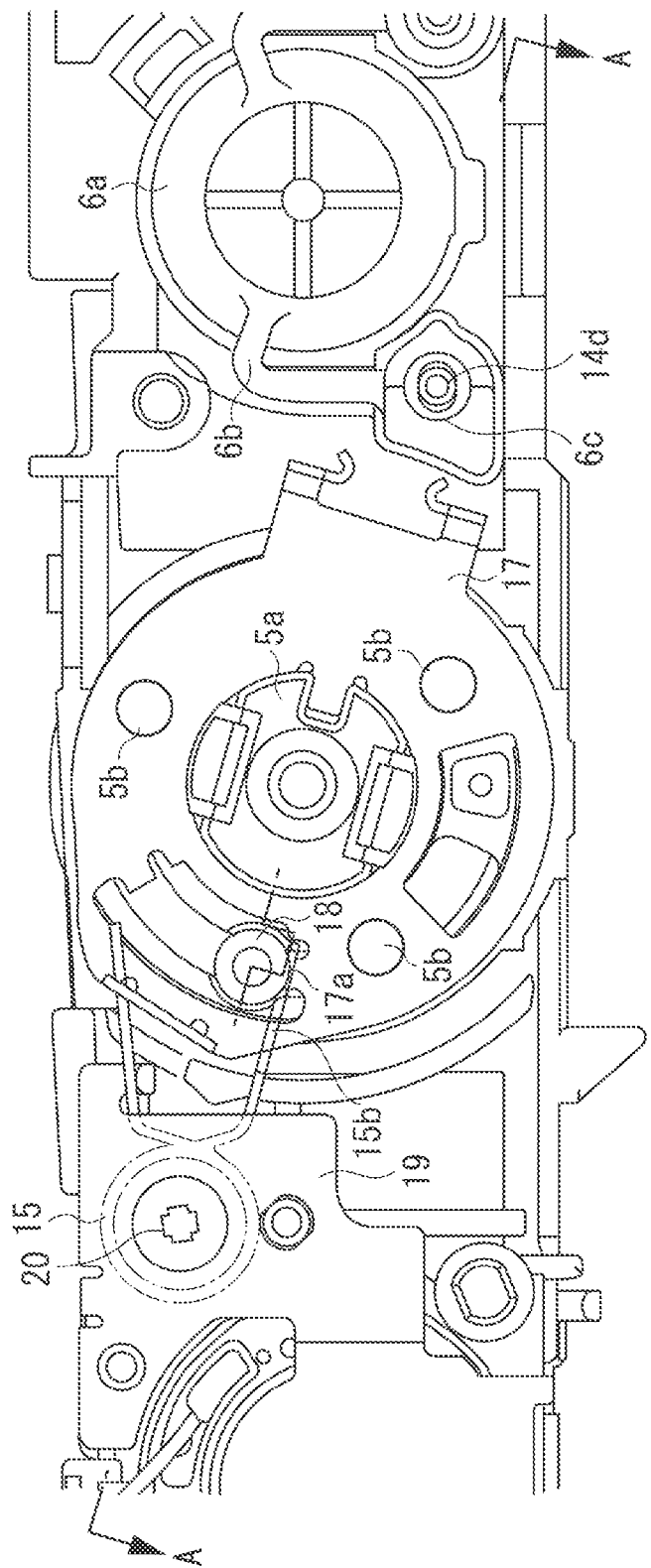

Next, the section in the rotation axis direction of the zoom lever unit 30 will be described with reference to FIGS. 6A and 6B. FIG. 6A is a sectional view taken along the line A-A of FIG. 6B, which illustrates the state in which the zoom lever 5 has been rotated to the limit of the rotation range. As illustrated in FIG. 6B, when the zoom lever 5 is rotated to the limit of the rotation range, a state is attained in which the raised-and-bent portion 17a of the zoom lever fixation plate 17 and the elastic member 18 are held in contact with each other. The raised-and-bent portion 17a of the zoom lever fixation plate 17 is held in contact with the elastic member 18 not via the shear plane of the plate but via the bent surface portion thereof, so that the elastic member 18 is not easily flawed, thus providing a construction of durability. Further, the raised-and-bent portion 17a of the zoom lever fixation plate 17 is bent in the upper direction of the zoom lever fixation plate 17, and the coil spring arm portion 15b is guided by the protrusion 17b bent to the lower side of the zoom lever fixation plate 17. That is, the portions held in contact with the elastic member 18 vary in height direction.

Further, due to the tapering in releasing, the elastic member mounting shaft 14a is thicker on the proximal end side and thinner on the distal end side. In view of this, by using the proximal end side of the elastic member mounting shaft 14a as a stopper for the zoom lever 5, the elastic member mounting shaft 14a is made little subject to fatigue fracture.

As illustrated above, it is possible to reduce, effectively and while suppressing an increase in the number of components, the sounds generated through operation of the zoom lever 5, such as the collision noise generated when the zoom lever 5 is rotated to the limit of the rotation range, and the oscillation noise or collision noise generated when the zoom lever, which has been rotated, is restored to the initial state.

Although in the above exemplary embodiment the zoom lever 5 is urged toward the neutral position, which is the initial position, by using the coil spring 15, it is also possible to urge the zoom lever 5 toward the neutral position, which is the initial position, by using a member other than a coil spring. For example, it is also possible to adopt rubber or the like so long as it provides an elastic member which is deformed from a first state to a second state when the zoom lever 5 is rotated from the initial position and which restores the zoom lever 5 to the initial position with a force causing it to be restored to the first state from the second state. By holding the elastic member when this elastic member is in the first state, it is possible to reduce the collision noise generated when the zoom lever 5, which has been rotated, is restored to the initial state.

In the first exemplary embodiment, one arm of the coil spring arm portion 15b contacts a corner of the protrusion 17b when the zoom lever 5 is rotated to thereby cause stick slip, whereby a self-excited oscillation is generated; this is reduced by causing the other arm of the coil spring arm portion 15b to contact the elastic member 18 so as to deform the same. In a second exemplary embodiment, described below, the self-excited oscillation of the coil spring arm portion 15b is further reduced than in the first exemplary embodiment, reducing the rubbing noise (oscillation noise) generated through rubbing against the protrusion 17b as a result of the oscillation of the coil spring arm portion 15b.

Figure 7A:
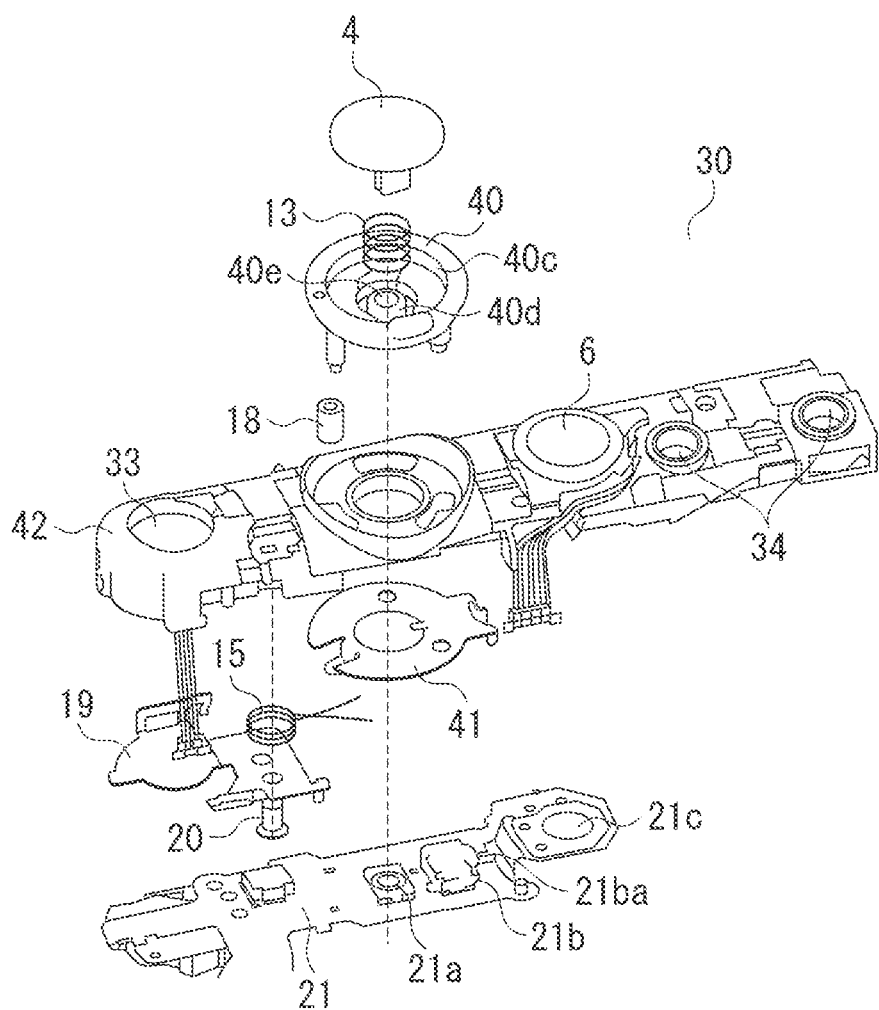
FIGS. 7A and 7B are exploded perspective views of a zoom lever unit according to a second exemplary embodiment of the present invention.
Figure 7B:
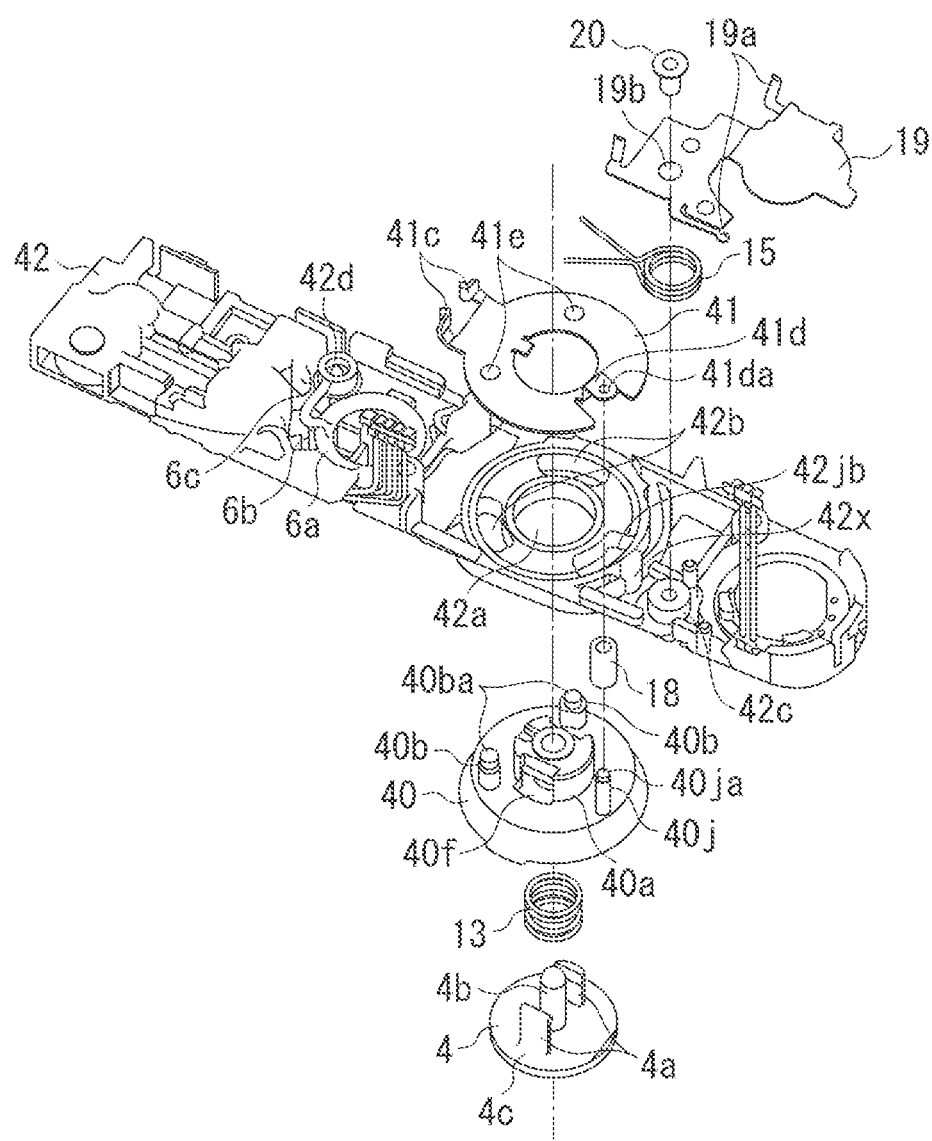

In the second exemplary embodiment, the member to which the elastic member 18 is mounted is different from that of the first exemplary embodiment. As illustrated in FIGS. 7A and 7B, a zoom lever 40 is provided with a shaft to which the elastic member 18 is mounted.

In the following, the construction of the zoom lever unit 30 according to the present exemplary embodiment will be described with reference to FIGS. 7A and 7B through FIGS. 10A and 10B; the portions similar to those of the first exemplary embodiment are indicated by the same reference numeral, and a detailed illustration thereof will be left out.

FIG. 7A is an exploded perspective view of the zoom lever unit 30 as viewed from the front side, and FIG. 7B is an exploded perspective view of the zoom lever unit 30 as viewed from the bottom side.

On the upper surface of the zoom lever 40, there exist hollow portions in two stages; an upper, larger hollow portion 40c serves as a space to be entered by the key top 4c of the release button 4. Further, at the center of the zoom lever 40, there is provided a hole 40e, through which the shaft 4b of the release button 4 is to be passed. On the lower surface of the zoom lever 40, there is provided a rotation shaft 40a larger than the hollow portion 40d. Further, there are provided a pair of D-shaped holes 40f extending through the side surface of the rotation shaft 40a.

On the outer side of the rotation shaft 40a, three shafts, i.e. two shaft 40b and an elastic member mounting shaft 40j for mounting the elastic member 18 are provided at substantially equal intervals. At the distal ends of the shaft 40b and of the elastic member mounting shaft 40j, there are provided swaging conical portions 40ba and 40ja to be crushed through heat swaging after being fit-engaged with holes 41e and 41da of a zoom lever fixation plate 41.

A base member 42 is provided with a through-hole 42a so as to allow insertion of the rotation shaft 40a extending from the lower side of the zoom lever 40. The through-hole 42a is the rotation center hole of the zoom lever 40, and is rotatably and slidably fit-engaged with the rotation shaft 40a. Further, the base member 42 is provided with two through-holes 42b and a through-hole 42jb so as to allow insertion of two shafts 40b extending downward from the zoom lever 40 and of the elastic member 18 mounted to an elastic member mounting shaft 40j.

Due to the through-holes 42b and the shafts 40b, the rotation of the zoom lever 40 is regulated, and the rotation range is restricted.

On the lower surface of the base member 42, there are provided a shaft portion 42x for maintaining the coil spring 15 at the neutral position, a spring mounting shaft 42c for mounting the coil spring 15, and a shaft 42d into which a fixation bonding portion 6c at the distal end of a spring portion 6b extending from a key top 6a of the power button 6 is to be inserted.

The zoom lever fixation plate 41 is provided with holes 41e to be entered by conical portions 40ba of the shafts 40b of the zoom lever 40. Further, an arm portion 41d is provided in the outer peripheral portion of the zoom lever fixation plate 41. The arm portion 41d serves to hold, in the vertical direction of the zoom lever unit 30, the elastic member 18 mounted to the zoom lever 40; its proximal end portion is downward bent, and its distal end portion is bent so as to extend in the outer peripheral direction, resulting in a substantially L-shaped configuration. This arm portion 41d is provided with a hole 41da to be entered by the conical portion 40ja of the elastic member mounting shaft 40j of the zoom lever 40. By heat swaging the shafts 40b and the elastic member mounting shaft 40j after fit-engaging them with the holes 41e and 41da, the zoom lever 40 and the zoom lever fixation plate 41 are fixed to each other, and the elastic member 18 is prevented from being detached with the arm portion 41d of the zoom lever fixation plate 41.

Further, the zoom lever fixation plate 41 is provided with a pair of arm portions 41c configured to rotate a lever member 21ba of a zoom switch 21b mounted on the operation printed circuit board 21 while holding the same therebetween.

Figure 8A:
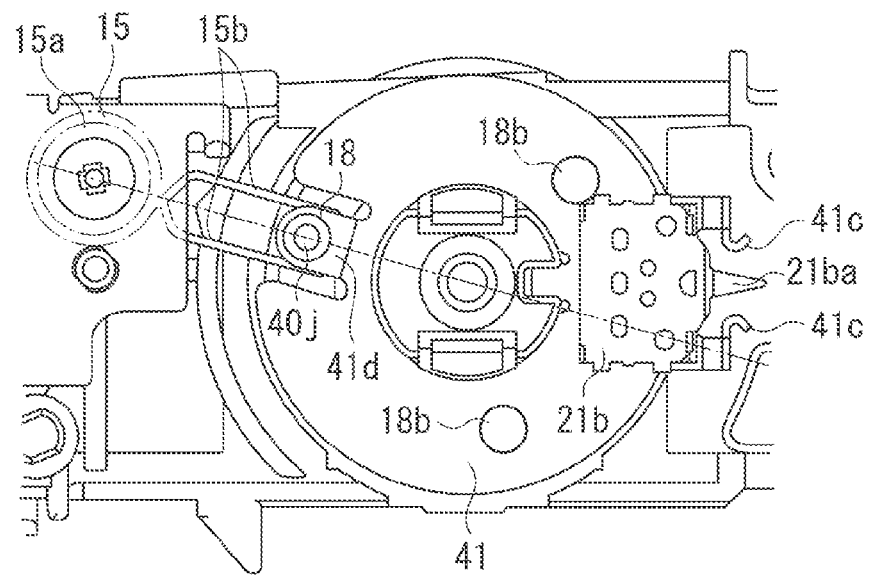
FIGS. 8A and 8B are diagrams illustrating the movement of a zoom lever unit when the zoom lever according to a second exemplary embodiment is rotated.
Figure 8B:
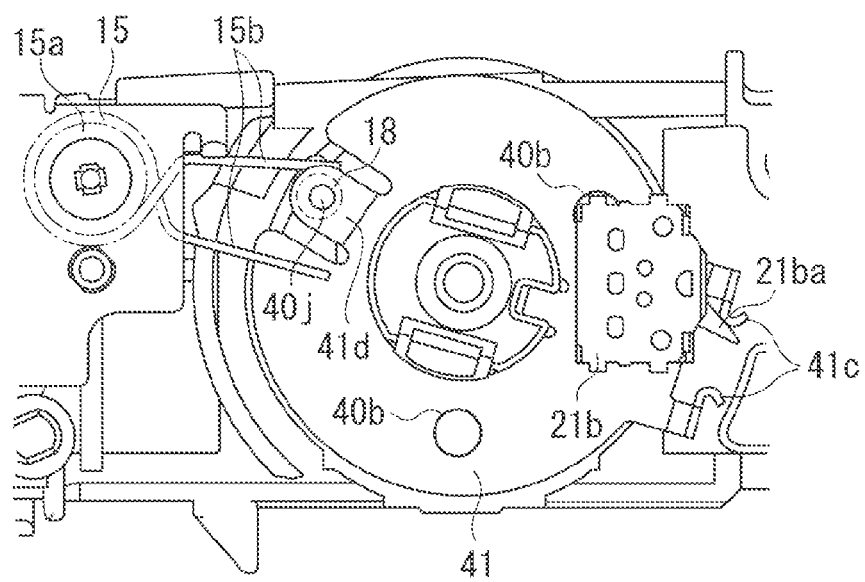

Next, the movement of the zoom lever unit 30 when the zoom lever 40 is rotated will be described with reference to FIGS. 8A and 8B. FIGS. 8A and 8B are diagrams illustrating the zoom lever unit 30 as viewed from below. The elastic member 18 is arranged so as to be in contact with the portions in the vicinity of the distal ends of the coil spring arm portion 15b. The portions in the vicinity of the distal ends of the coil spring arm portion 15b, which is of small charging force, and the elastic member 18, which has a spring constant still smaller than that of the coil spring arm portion 15b, are brought into contact with each other, whereby it is possible to accurately maintain the zoom lever 40 at the initial position.

When the zoom lever 40 is rotated as illustrated in FIG. 8B from the initial position illustrated in FIG. 8A, the side surface of the through-hole 42jb of the base member 42 and the elastic member 18 contact each other, so that it is possible to suppress the collision noise generated at the time of contact. Further, the moving portion of the coil spring arm portion 15b and the elastic member 18 are brought into contact with each other, so that it is possible to reduce the self-excited oscillation of the coil spring arm portion 15b, which is generated through the rotation of the zoom lever 40, and, at the same time, it is possible to reduce the rubbing noise since it is in contact with the elastic member 18 even if it oscillates.

Next, the condition of the elastic member 18, the shafts 40b of the zoom lever 40, and the through-holes 42b and the through hole 42jb of the base member 42 when the zoom lever 40 is rotated will be described with reference to FIGS. 9A, 9B, and 9C.

Figure 9A:
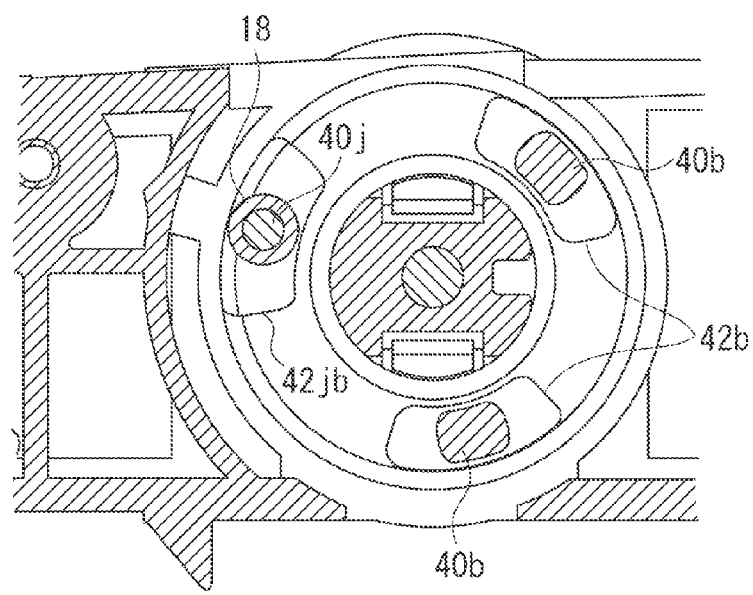
FIGS. 9A, 9B, and 9C are sectional views illustrating the condition of an elastic member, of the shafts of the zoom lever and of a through-hole of a base member when the zoom lever according to the second exemplary embodiment is rotated.
Figure 9B:
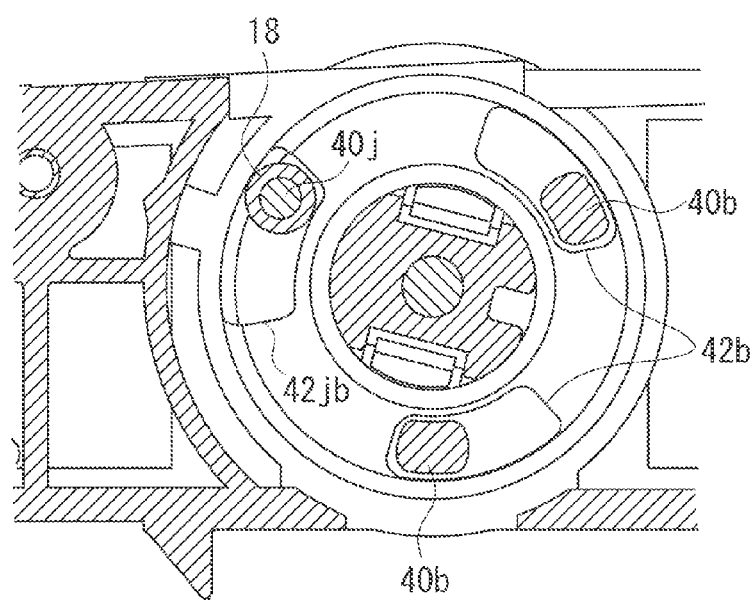
Figure 9C:
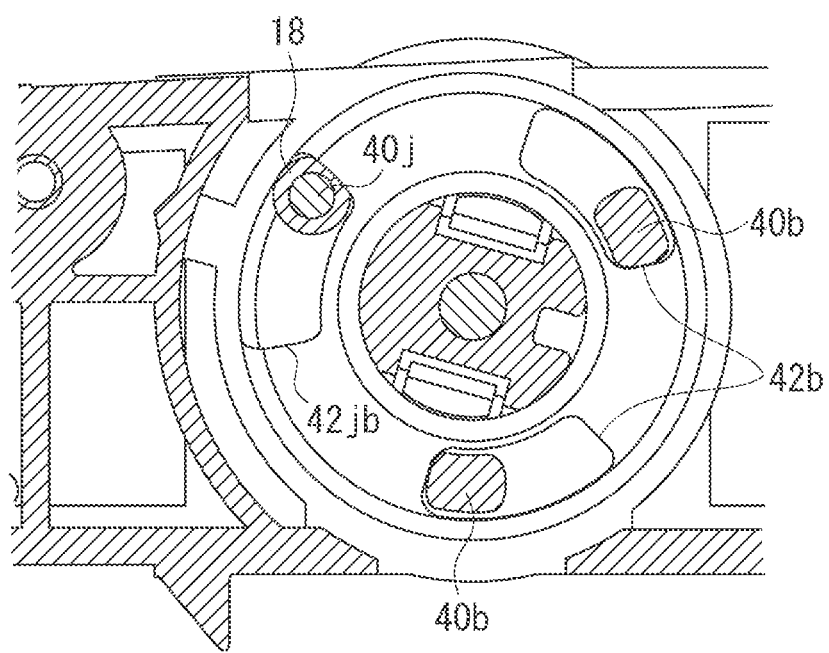

As the zoom lever 40 is rotated from the initial position illustrated in FIG. 9A, the elastic member 18 and the side surface of the through-hole 42jb are brought into contact with each other before the shafts 40b and the side surfaces of the through-holes 42b are brought into contact with each other as illustrated in FIG. 9B. When, in the state in which the elastic member 18 and the side surface of the through-hole 42jb are in contact with each other, the zoom lever is rotated, the elastic member 18 undergoes elastic deformation as illustrated in FIG. 9C, and the shafts 40b and the side surfaces of the through-holes 42b are brought into contact with each other, with the result that the rotation limit of the zoom lever 40 is reached. In this way, before the shafts 40b and the side surfaces of the through-holes 42b are brought into contact with each other, the elastic member 18 and the side surface of the through-hole 42jb are brought into contact with each other, whereby it is possible to reduce the shock produced when the shafts 40b and the side surfaces of the through-holes 42b are brought into contact with each other. Thus, it is possible to reduce the collision noise produced when the shafts 40b and the side surfaces of the through-holes 42b are brought into contact with each other. Further, it is also possible to reduce the shock transmitted to the finger of the operator when the zoom lever 40 is rotated to the rotation limit.

Further, when an excessive force is applied to the zoom lever 40, the force is received not only by the elastic member mounting shaft 40j but also by the shafts 40b, so that it is possible to prevent fracture of the elastic member mounting shaft 40j. Further, by using the proximal end side of the elastic member mounting shaft 40j as a stopper for the zoom lever 40, the elastic member mounting shaft 40j is made little subject to fatigue fracture.

Figure 10A:
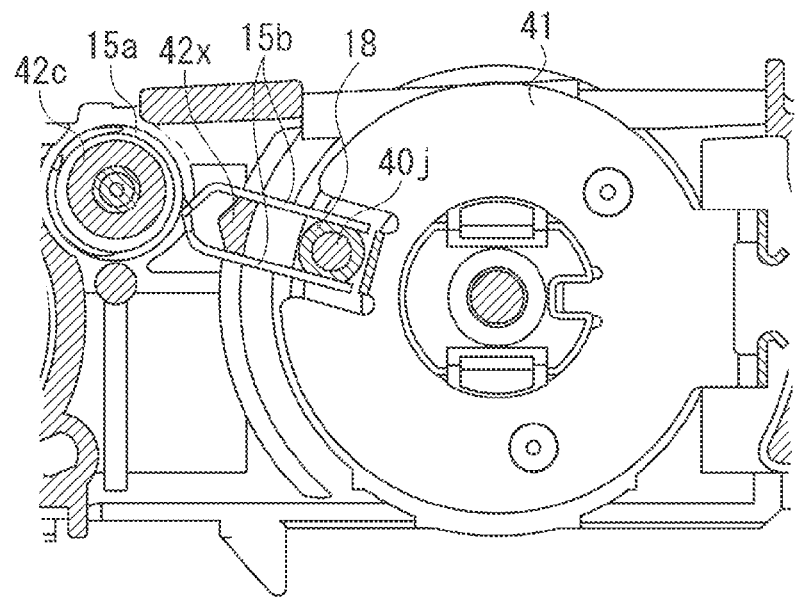
FIGS. 10A and 10B are sectional views illustrating the condition of the elastic member and of a coil spring when the zoom lever according to the second exemplary embodiment is rotated.
Figure 10B:
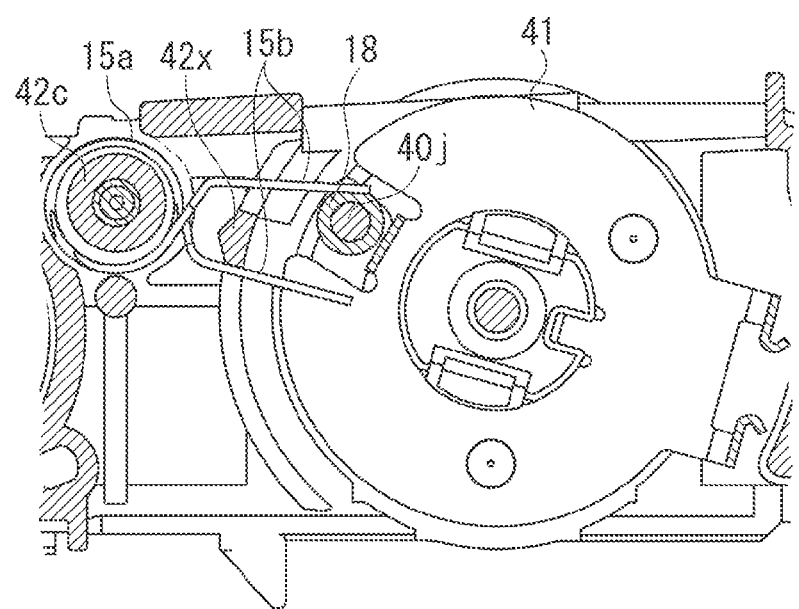

Next, the condition of the elastic member 18 and of the coil spring 15 when the zoom lever 40 is rotated will be described with reference to FIGS. 10A and 10B. FIGS. 10A and 10B are sectional views for facilitating the description of the condition of the elastic member 18 and of the coil spring 15; they are diagrams illustrating the zoom lever unit 30 from below.

As illustrated in FIG. 10A, in the state in which the zoom lever 40 is at the initial position, a part (sectional portion) of the elastic member 18 is held between the distal end portions of both arms of the coil spring arm portion 15b to be elastically deformed into an oval shape.

The coil spring arm portion 15b is fixed in position, with both arms thereof being in contact with the shaft portion 42x of the base member 42 so as to hold the shaft portion therebetween.

In this way, in the state in which the zoom lever 40 is at the initial position, both arms of the coil spring arm portion 15b are in contact with both the elastic member 18 and the shaft portion 42x. Further, the width of the elastic member 18 in the rotating direction of the zoom lever 40 is larger than that of the shaft portion 42x. When the zoom lever 40 is restored to the initial position, it begins to be brought into contact with both arms of the coil spring portion 15b earlier than the shaft portion 42x. Thus, in the state in which the zoom lever 40 is at the initial position, the coil spring arm portion 15b and the shaft portion 42x are held in contact with each other, whereby it is possible to diminish the play in the rotating direction of the zoom lever 40 when no rotating operation is being performed. Further, the elastic member 18 absorbs the force produced when the zoom lever 40 is restored to the initial position, whereby it is possible to reduce the force with which the coil spring arm portion 15b collides with the shaft portion 42x, making it possible to reduce the collision noise generated at the time of collision.

Further, the elastic member 18 is arranged so as to be brought into contact with the distal end side of the coil spring arm portion 15b with respect to the shaft portion 42x. Thus, if the width in the rotating direction of the zoom lever 40 of the elastic member 18 is larger than that of the shaft portion 42x, the distal end portions of the coil spring arm portion 15b bend backward, whereby it is possible to bring both arms of the coil spring arm portion 15b into contact with both the elastic member 18 and the shaft portion 42x. In this connection, by taking into account the fact that the distal end portions of the coil spring arm portion 15b bend back, it is possible to further enlarge the width of the elastic member 18, and it is possible for the elastic member 18 to absorb the force produced when the zoom lever 40 is restored to the initial position by the elastic member 18.

Further, even if the zoom lever 40 is rotated from the state illustrated in FIG. 10A to the state illustrated in FIG. 10B, it is possible to maintain the state in which the moving arm of the coil spring arm portion 15b and the elastic member 18 are held in contact with each other. Thus, it is possible to reduce the self-excited oscillation of the coil spring arm portion 15b, which is generated through the rotation of the zoom lever 40, and, at the same time, it is possible to reduce the rubbing noise since it is in contact with the elastic member 18 even if it oscillates.

As illustrated above, it is possible to reduce, effectively and while suppressing an increase in the number of components, the sounds generated through operation of the zoom lever 40, such as the collision noise generated when the zoom lever 40 is rotated to the limit of the rotation range, and the oscillation noise or collision noise generated when the zoom lever, which has been rotated, is restored to the initial state.

As in the first exemplary embodiment, in the present exemplary embodiment also, it is also possible to use some other elastic member instead of the coil spring 15.

Although the two exemplary embodiments illustrated above are applied to a zoom lever used for the zoom operation in an imaging apparatus, they may also be applied to an operation member for some other function, which is movable from an initial position with respect to the apparatus body. For example, the exemplary embodiments may be applied to an operation member which performs image forwarding operation to change a displayed image to a next image in a reproduction mode in which one of a plurality of images recorded on a recording medium is displayed on an image display unit.

Further, the above exemplary embodiments are also applicable to an operation member for the operation of a function that can be executed in an electronic apparatus other than an imaging apparatus, which means the present invention is applicable to any electronic apparatus having an operation member movable from an initial position with respect to the apparatus body.

Further, although the two exemplary embodiments illustrated above are applied to an operation member rotatable with respect to an apparatus body, they may also be applied to an operation member linearly movable with respect to an apparatus body and configured to perform different control operations according to the direction of movement from the initial position. Even in the case of an operation member linearly movable with respect to an apparatus body, it is possible to attain the same effect as that of the above exemplary embodiments so long as there is adopted a construction in which the operation member is urged toward an initial position by an elastic member and which has a regulating portion configured to regulate the movement range of the operation member by coming into contact with the operation member.

Further, the present invention is also applicable to a construction in which an operation member is not movable in two directions from an initial position with respect to an apparatus body but movable only in one direction from the initial position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-125552 filed Jun. 3, 2011, which is hereby incorporated by reference herein in its entirety.

What is claimed is:

1. An electronic apparatus comprising:
   an operation member movable from an initial position with respect to an apparatus body;
   a first elastic member configured to be deformed from a first state to a second state when the operation member is moved from the initial position and to restore the operation member to the initial position with a force produced to return from the second state to the first state;
   a second elastic member configured to be held by the first elastic member when the first elastic member is in the first state; and
   a contact portion configured not to come into contact with the second elastic member when the operation member is at the initial position and to come into contact with the second elastic member when the operation member is moved from the initial position.

2. The electronic apparatus according to claim 1, wherein the operation member is rotatable from the initial position with respect to the apparatus body.

3. The electronic apparatus according to claim 1, wherein the first elastic member includes a pair of arm portions, and wherein the second elastic member is held between the pair of arm portions when the first elastic member is in the first state.

4. The electronic apparatus according to claim 3, wherein the second elastic member is constantly in contact with at least one of the pair of arm portions.

5. The electronic apparatus according to claim 3, wherein the second elastic member contacts distal end portions of the pair of arm portions.

6. The electronic apparatus according to claim 1, wherein a position where the second elastic member contacts the first elastic member is different from a position where the second elastic member contacts the contact portion.

7. The electronic apparatus according to claim 6, wherein the second elastic member is of a cylindrical configuration into which a mounting portion, which does not move with respect to the apparatus body as the operation member moves, is inserted, and
   wherein the position where the second elastic member contacts the contact portion is on a proximal end side of the mounting portion with respect to the position where the second elastic member contacts the first elastic member.

8. The electronic apparatus according to claim 6, wherein the second elastic member is of a cylindrical configuration into which a mounting portion, which moves with respect to the apparatus body as the operation member moves, is inserted, and
   wherein the position where the second elastic member contacts the contact portion is on a proximal end side of the mounting portion with respect to the position where the second elastic member contacts the first elastic member.

9. The electronic apparatus according to claim 1, wherein the contact portion is provided at an end, in a moving direction of the operation member, of a hole portion provided in the operation member.

10. The electronic apparatus according to claim 9, wherein the contact portion is a portion extending from the end of the hole portion in a direction substantially perpendicular to the moving direction of the operation member.

11. The electronic apparatus according to claim 1, further comprising:
    a regulating portion configured to regulate a movement range of the operation member,
    wherein the contact portion contacts the second elastic member before the operation member is moved from the initial position to a limit of the movement range regulated by the regulating portion.

* * * * *